(12) United States Patent
Streatfield et al.

(10) Patent No.: US 8,684,628 B2
(45) Date of Patent: Apr. 1, 2014

(54) WINDING APPARATUS

(75) Inventors: Roy Streatfield, Atlanta, GA (US);
Akitoshi Ohira, Atlanta, GA (US)

(73) Assignee: Sekisui Chemical Co., Ltd., Osaka (JP)

( * ) Notice: Subject to any disclaimer, the term of this patent is extended or adjusted under 35 U.S.C. 154(b) by 137 days.

(21) Appl. No.: 13/113,299

(22) Filed: May 23, 2011

(65) Prior Publication Data

US 2012/0298241 A1    Nov. 29, 2012

(51) Int. Cl.
*F16L 55/18*    (2006.01)

(52) U.S. Cl.
USPC .................. 405/184.2; 405/184.1; 138/98

(58) Field of Classification Search
USPC ......... 405/184.1, 184.2, 150.1; 138/120, 155, 138/98; 29/700, 819, 820, 281.3; 269/111, 269/117, 100, 289 MR
See application file for complete search history.

(56) References Cited

U.S. PATENT DOCUMENTS 5,636,714 A * 6/1997 Viola ........................... 187/324
6,234,226 B1 * 5/2001 Kitahashi et al. ............. 156/391

FOREIGN PATENT DOCUMENTS

| JP | 10-274389 A | 10/1998 |
| JP | 2001-138398 A | 5/2001 |
| JP | 2004331895 | * 11/2004 |
| JP | 2009-144744 A | 7/2009 |

* cited by examiner

*Primary Examiner* — Sean Andrish
(74) *Attorney, Agent, or Firm* — Cheng Law Group, PLLC

(57) ABSTRACT

The winding apparatus has a forming frame which goes inside an underground damaged pipe, and a rail which regulates the circumference track of a forming frame as the joint mechanism interlocks adjacent portions of a plastic strips. The forming frame has a plurality of guides that are connected extend along with a rail. Each guide contains a guide roller which can rotate freely about an end of the corresponding roller shaft. Each guide roller has an outside large diameter part and an inside small diameter part. The rail has a guide groove portion for the large diameter part of a guide roller at each edge of a course in a width direction.

8 Claims, 16 Drawing Sheets

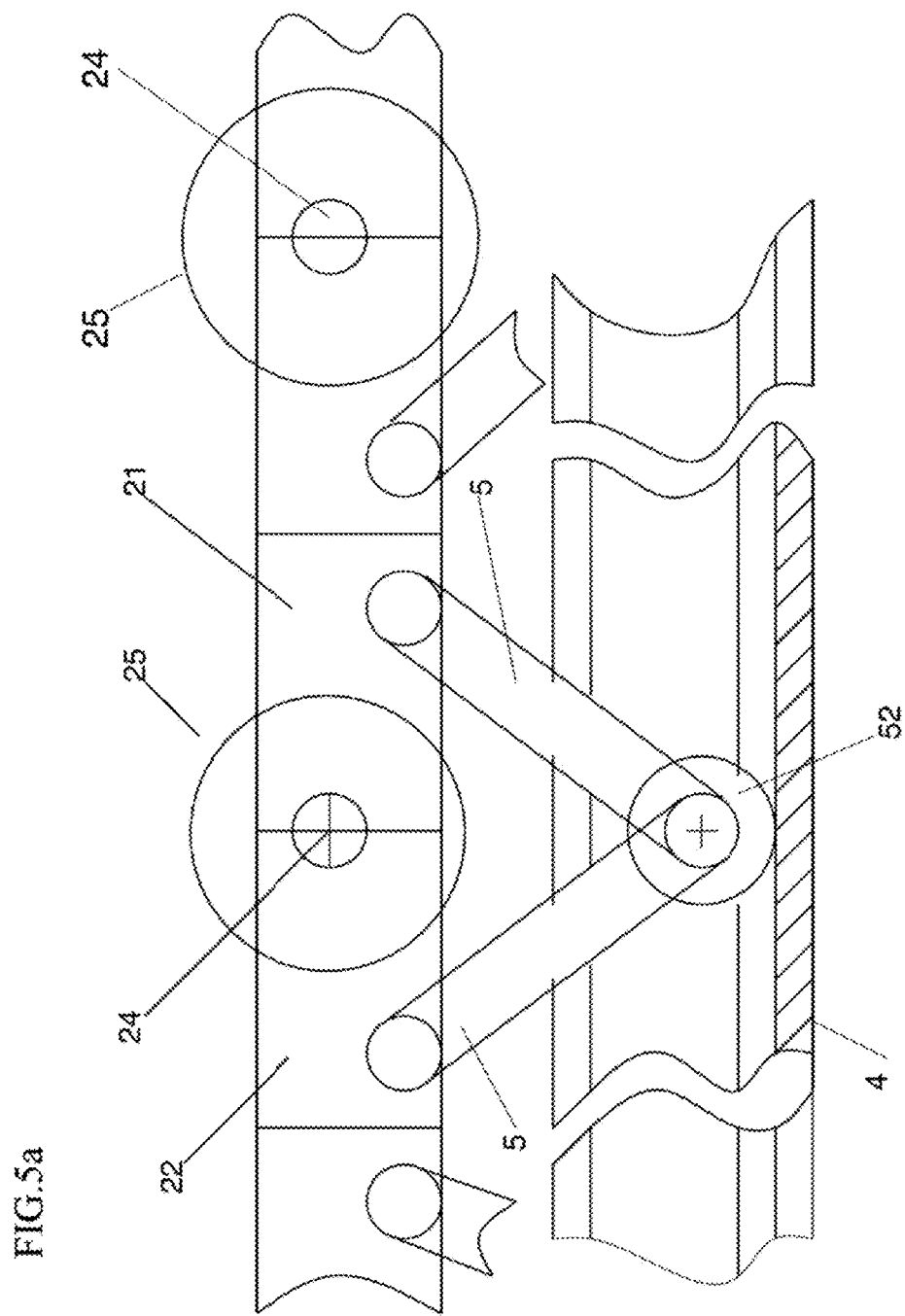

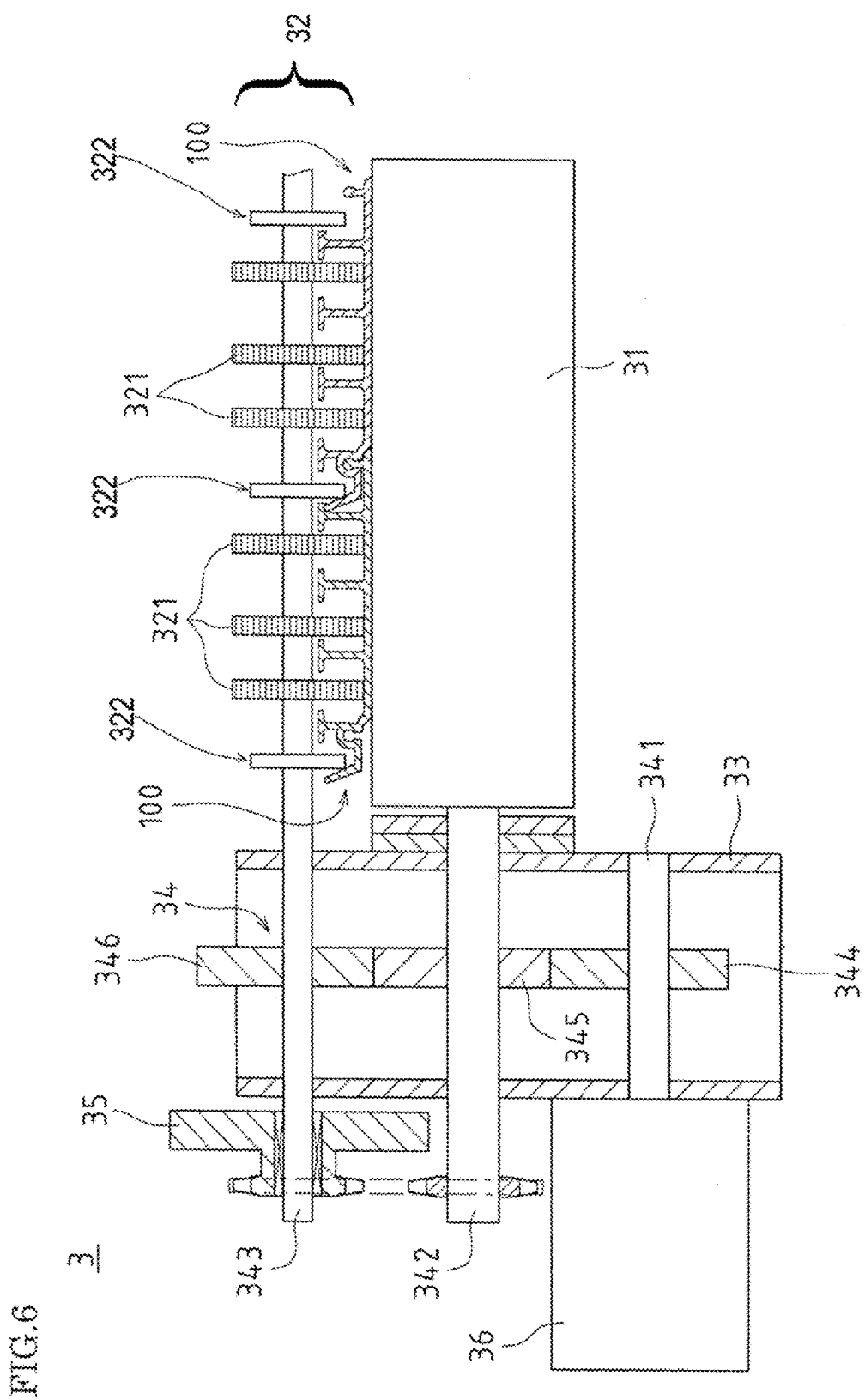

FIG.12
(a)
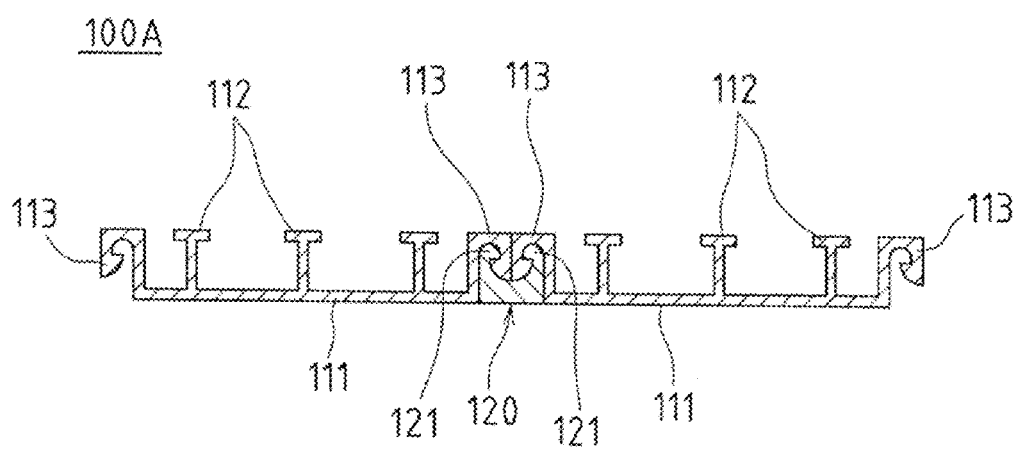
(b)
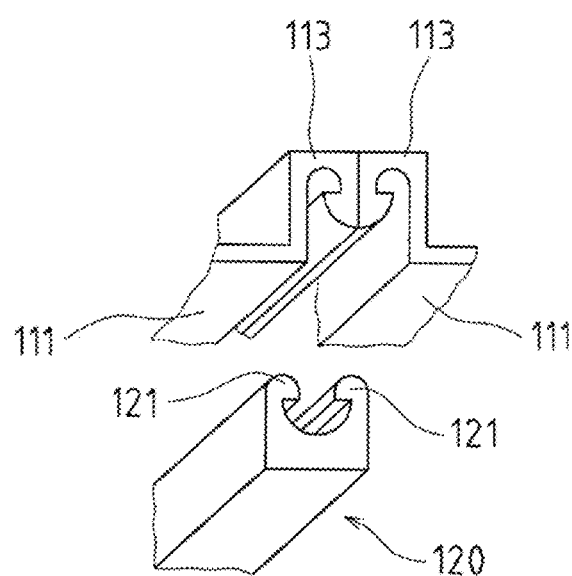

WINDING APPARATUS

BACKGROUND OF THE INVENTION

1. Field of the Invention

The present invention relates to an apparatus for lining pipe which renovates the inside of an underground damaged pipe.

2. Discussion of the Background

In order to renovate a damaged pipe buried in the ground, a plastic strip which has joint portions along both side edges is spirally wound to line the inside of the underground damaged pipe. A plastic strip is supplied to the underground damaged pipe and spirally wound with an apparatus to join the plastic strip to itself at joint portions thereof.

According to Japanese patent publication Nos. 1998-274389, 2001-138398, and 2009-144744, an apparatus for lining pipe is arranged in an underground damaged pipe, and the plastic strip is pulled out from the storage drum and supplied to the apparatus to line the damaged pipe. Subsequently, the winding apparatus is rotated inside the underground damaged pipe, and the plastic strip is wound spirally. Therefore with the winding apparatus, the joint portions of adjacent portions of the plastic strip are interlocked as the plastic strip is wound.

The winding apparatus is equipped with a rail which has rigidity and holds its form. The forming frame can move the perimeter of the rail through a guide, and the lining of an underground damaged pipe having various cross-sectional shapes is formed. The rail has a form similar to the cross-sectional form of the underground damaged pipe, and specifies the form of the forming frame and the lining pipe. A plurality of connectors 92 are installed in apparatus 91 between a forming frame 93 and rails 94, as shown in FIG. 13. The connectors 92 follow the track of the forming frame 93 along with the perimeter of the rail 94.

As shown in FIG. 14, the rail 94 forms a channel which contains the roller 95 with connector 92. Winding a plastic strip 100 spirally requires a heavy load in the direction of a longitudinal axis be applied to the forming frame 93 and the connector 92. The connector 92 is positioned in the rail 94 and moves on a longitudinal axis (the axis of N in FIG. 14) in response to the load. The rollers 95 are the width of opening 941, are on the inside of the rail 94, and permit the connector 92 to move along the longitudinal axis.

Since there is a possibility of spoiling the dimensional accuracy of the lining pipe when the connector 92 moves too much along the longitudinal axis (N) into the rail 94, it is necessary to regulate movement of a roller 95 within a limited range. Therefore, a guide part 96, in alignment with the longitudinal axis (N), is attached to the inside of the rail 94.

As shown in FIG. 14, the guide part 96 is fixed in two positions at each end of an inside of the rail 94. The guide part 96 has a size corresponding to the size of the outside of the roller 95, and is in upper and lower positions inside of the rail 94. The angle part of the outside of the roller 95 hits the guide part 96 of the rail 94 when the roller 95 rotates, thereby restricting the movement of the connector 92 along the longitudinal axis. A bolt-head part 97 projected on the outside of the roller 95 moves between the upper and lower guide parts 96. The rail 94 of the conventional winding apparatus 91 is formed to be thick in order to receive a load through the connector 92.

The lip part 98 faces the forming frame 93, and is prepared along a longitudinal axis. A full load acts on the pipe bottom side of the underground damaged pipe 7 through a roller 95 at the lip part 98. Therefore, the lip part 98 is thickly reinforced to support the roller 95. As a result, the rail 94 is needed to be formed from thick materials making the rail 94 and its associated parts very heavy. It is hard to assemble a heavy rail 94, and as a result, installation is lengthy. Also, it is difficult to manufacture the rail 94 and the guide part 96 with high precision and thus, manufacturing costs are increased. Further, in the lining pipe process, with the bearing installed inside the roller 95 and the roller 95 contacting the inside of the guide part 96 contained within the rail 94, the roller 95 is easily damaged. In addition, inferior durability of the roller 95 is experienced when a load is applied along the longitudinal axis through the connector 92. Also, exchange and repair of the roller 95 of a bearing portion also takes time and effort.

SUMMARY OF THE INVENTION

The present invention improves the reliability and durability of the winding apparatus. In addition, the winding apparatus of the present invention is easier and more cost effective to manufacture and assemble while providing greater accuracy in the new spirally wound pipe than the prior art apparatuses.

The first purpose of the present invention is to reduce the weight of the rail which receives the load. The second purpose of the present invention is to provide easier assembly of the components and to improve productivity and workability. The third purpose of the present invention is to improve the structure so that the roller portion does not break in the guide part, thereby making exchange and repair unnecessary, even if a heavy load acts on the forming frame, the rail, and the guide part. This apparatus spirally winds a plastic strip to the shape of the forming frame while continuously joining adjacent side edges of the plastic strip to form a lined pipe.

The present invention consists of a forming frame which guides and holds a plastic strip as the plastic strip rotates around the inside of an underground damaged pipe, a joint mechanism which interlocks the junctions of adjacent portions of the plastic strip, and a rail which is arranged inside a forming frame that regulates the circumference and shape of the newly formed spiral pipe. The forming frame includes a plurality of links connected to rotate mutually. The forming frame is connected with a plurality of connectors that move along the circumference of the forming frame while following the rail. Each connector consists of a roller shaft supported by the forming frame, and rotatable guide rollers supported at each end of the roller shaft. Each guide roller is formed with an outside large diameter part and a small diameter part. The rail holds the guide roller and defines a course along which the guide roller moves. This course has a guide groove portion in which the large diameter part of the guide roller moves at each edge of the course in a width direction.

A plurality of connectors connected to the forming frame move along the course. The connector restrains the forming frame on the perimeter of the rail, and the course which the forming frame moves around the circumference is regulated.

The connector moves smoothly, without varying from a pre-set course, even if a heavy load acts on the connector, since there is the guide groove portion for the large diameter part of the guide roller to move in. Because the connector moves smoothly inside of the rail, the guide roller does not break, and exchange of the guide roller and the time and effort needed for repair can be reduced.

The guide roller moves along with the guide groove portion. Therefore, it is not necessary to prepare a convex part inside a rail, the number of parts needed for the rail can be reduced, the weight of the rail can be reduced, and assembly can be simplified.

The rail has an outside cover part which covers the circumferential side and the side of the large diameter part of the guide roller. Since the outside cover part holds the large diameter part stably along the perimeter of the rail, the connector can move smoothly. Therefore, the rail can be formed to be lightweight.

The guide groove portion of the rail combines with the cover component, which includes an outside cover part, to form an "L"-shaped angle material. Thereby the course having the guide groove portion is provided in the rail.

The small diameter part of each guide roller has an inner pipe part which has a bearing surface, and an outer case part which accommodates this inner pipe part in its inner circumference. The outer case part slides with the roller shaft. It is supported so that a guide roller at each end of the roller shaft can rotate. In this case, as for each guide roller, it is desirable that the inner pipe part of the small diameter part is oil impregnated metal powder sintered bearing formed by applying lubricating oil or lubricous grease to sintering metal. Therefore, it is hard to damage an inner pipe part, and it becomes unnecessary to supply lubricating oil. Furthermore, manufacturing can be performed more economically.

A concave portion is formed in the outside of the guide roller. The coupling part of the guide roller and the roller shaft is accommodated in the concave portion. In this case, the roller shaft is equipped at each end with a bolt part, and this bolt part may be accommodated in the concave portion of the large diameter part of the corresponding guide roller, and coupled with a nut. The roller shaft may be equipped at each end with a female screw part, a bolt may be thrust into this female screw part through the concave portion of the large diameter part of each guide roller, and a bolt-head part may be located by this concave portion. The coupling part with the roller shaft is not projected outside of the guide roller, and therefore the rail holding the guide roller can be miniaturized.

The coupling part of the guide roller and the roller shaft is accommodated in the concave portion. Therefore, when the guide roller moves along the rail, since the coupling part with the roller shaft does not interfere with the rail, it can move smoothly. As such, the possibility of breakage is reduced.

BRIEF DESCRIPTION OF DRAWINGS

FIG. 5(a) is the forming frame, the rail, and the diagram showing a guide in another embodiment of the winding apparatus of the present invention FIG. 6 is a sectional side elevation and is showing a part of a joint mechanism of the winding apparatus of the present invention.

FIGS. 12 (a) and 12 (b) show another example of a plastic strip. FIG. 12 (a) is sectional drawing of a plastic strip, and FIG. 12 (b) is a perspective diagram of a junction and a connector.

DETAILED DESCRIPTION OF THE ILLUSTRATED EMBODIMENTS

The winding apparatus of the present invention is explained, referring to drawings.

Figure 1:
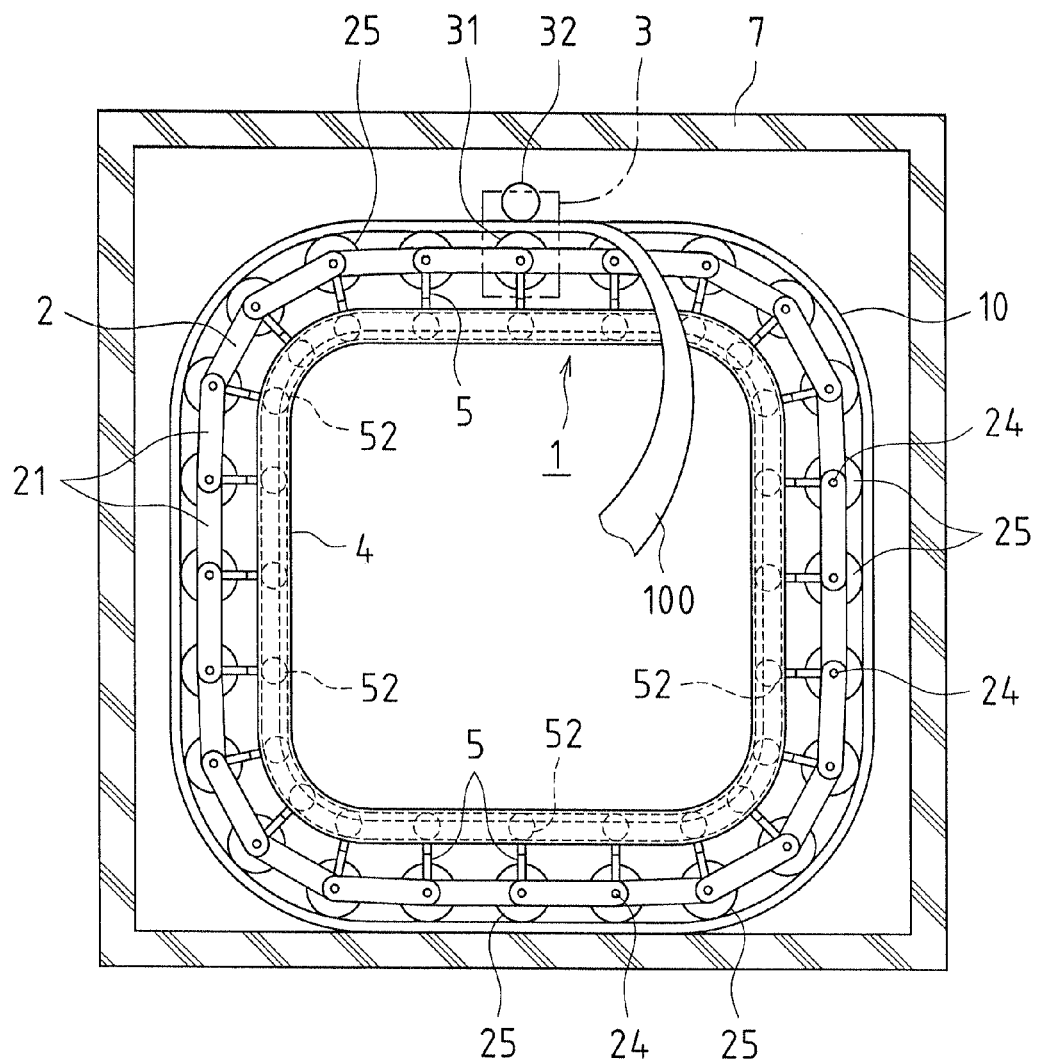
FIG. 1 is a front elevation of a winding apparatus according to a first embodiment of the present invention.
Figure 2:
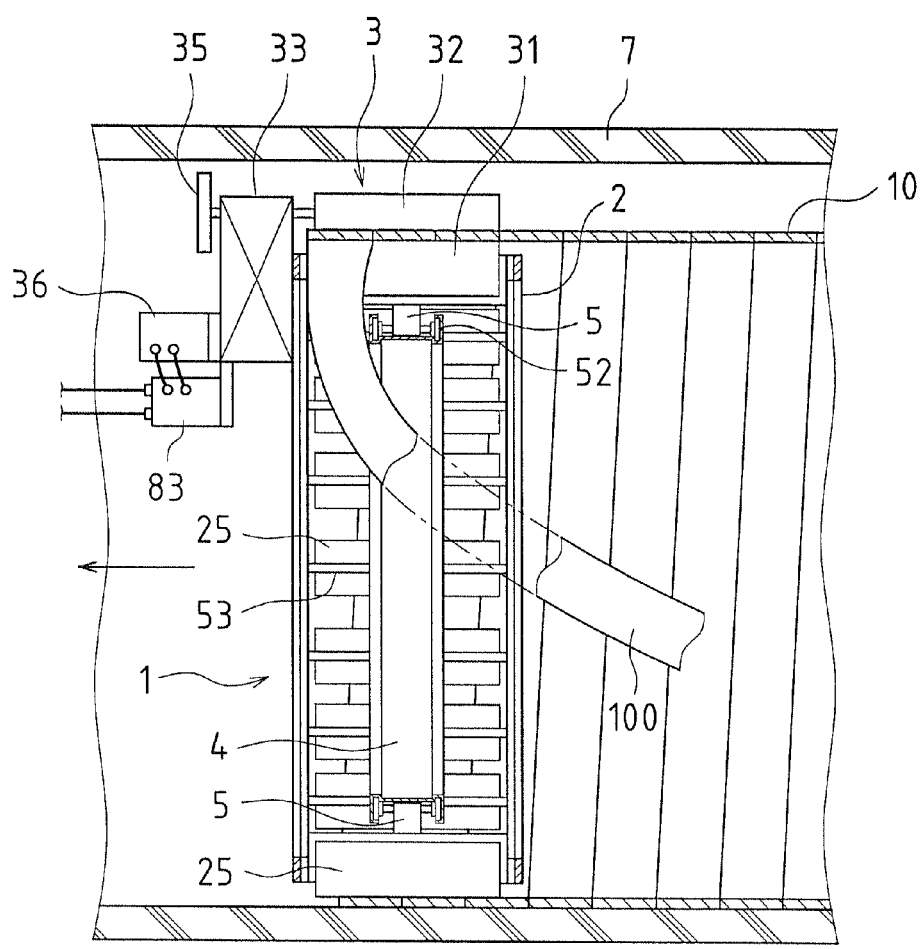
FIG. 2 is an axial sectional view of the winding apparatus shown in FIG. 1.

As shown in FIGS. 1 and 2, a forming frame 2 of the apparatus for lining pipe 10 holds a plastic strip 100 that is helically guided, and there is a joint mechanism 3 which interlocks the junctions of adjacent portions of the plastic strip 100 as the plastic strip 100 is wound. A rail 4 is prepared inside the forming frame 2 and regulates the circumference track of the forming frame 2.

Here, the plastic strip 100 is explained.

Figure 10:
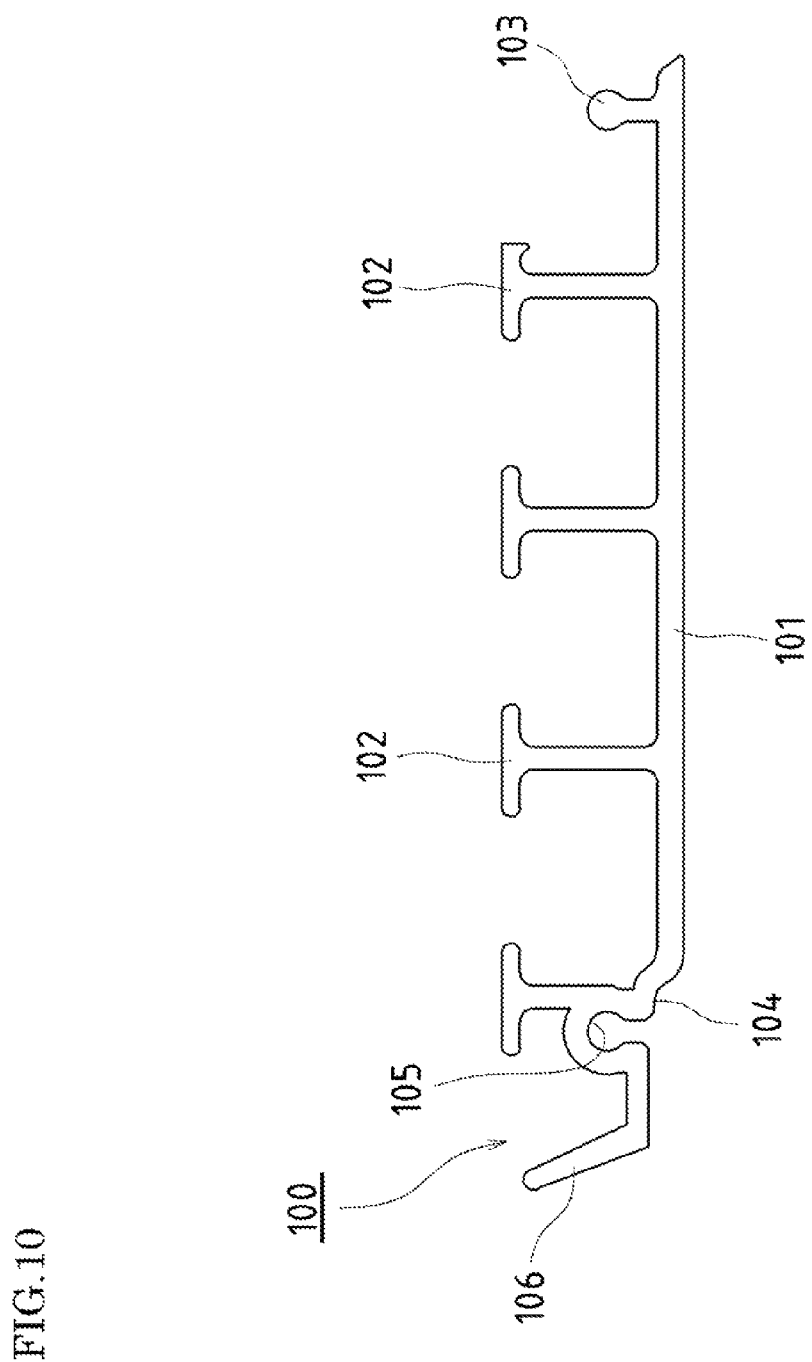
FIG. 10 is an end elevation showing an example of a plastic strip.

FIG. 10 is an end elevation showing an example of a plastic strip, and FIGS. 11(a) and 11(b) are end elevations showing interlocking of plastic strips.

The plastic strip 100 is a long flexible strip having the shape of a tie plate and may consist of materials, such as polyvinyl chloride, polyethylene, and polypropylene, which are extruded and molded.

The plastic strip 100 may have two or more ribs 102. In the embodiment shown in FIG. 10, the plastic strip 100 comprises four (4) ribs 102, and each rib 102 comprises a cross-sectional "T"-shaped part. The top of the "T" of each rib 102 is formed parallel to a body 101 of the plastic strip 100. The plastic strip 100 further comprises a joint rib 103 and a joint socket 105 at respective side edges thereof. The joint rib 103 can join with a joint socket of an adjacent portion of the plastic strip 100 to form a junction, and the joint socket 105 can join with a joint rib of an adjacent portion of the plastic strip 100 to form a junction.

The joint rib 103 is formed in one side edge (i.e., right side of FIG. 10) of the body 101. The joint socket 105, which is configured to receive a joint rib 103 of an adjacent portion of the plastic strip 100, is formed at the opposite side edge (i.e., left side of FIG. 10) of the body 101.

The joint socket 105 is adjoined to an adjacent portion of the plastic strip 100, and an inclination rib 106 is formed adjacent thereto. On the other side of the joint socket 105, a concave portion 104 is formed in the inside side of the body 101. That is, the concave portion 104 is a dent in the body 101. When joining adjacent portions of a plastic strip 100, the body 101 of the adjacent portion of the plastic strip 100 is arranged on the concave portion 104 of a first portion of the plastic strip 100, and the joint rib 103 of the adjacent portion of the plastic strip 100 is interlocked with the joint socket 105 of the first portion of the plastic strip 100. The plastic strip 100 is supplied to the winding apparatus 1 so that the rib(s) 102 is arranged to be on the outside side of the plastic strip 100.

A lining pipe process is shown in FIGS. 11(a) and 11(b). In particular, the plastic strip 100 is wound spirally such that one side edge of a plastic strip 100 and the other side edge of the plastic strip 100 adjoin mutually. More specifically, a joint rib 103 of a plastic strip 100 is inserted into the joint socket 105 of an adjacent portion of the plastic strip 100 and is interlocked. Referring to FIG. 11(b), the side edges of the adjacent portions of the plastic strip 100 are interlocked with one another, and a lining pipe having a predetermined dimension is produced. At this time, the joint rib 103 of the following portion of the plastic strip 100 and the side edge of a body 101 of the following portion of the plastic strip 100 are arranged at the concave portion 104 of the present portion of the plastic strip 100. The inclination rib 106 of the following portion of the plastic strip 100 fits into the 'T' shaped rib 102 of the present portion of the plastic strip 100 when the joint rib 103 of the present portion of the plastic strip 100 is interlocked with the joint socket 105 of the following portion of the plastic strip 100.

The plastic strip 100 is spirally wound within an underground damaged pipe.

As shown in FIG. 11(b), the plastic strip 100 interlock with itself to form the lining pipe.

In another embodiment of the present invention, the plastic strip which constitutes the lining pipe may be a plastic strip 100A that is interlocked with itself through a connector 120, as shown in FIGS. 12(a) and 12(b). FIG. 12 (a) is sectional drawing showing the plastic strip 100A, and FIG. 12 (b) is a junction of the plastic strip 100A, and a perspective diagram of the connector 120.

The plastic strip 100A comprises a connector 120 that interlocks the side edges of adjacent portions of the plastic strip 100A. The plastic strip 100A comprises two or more ribs 112 protruding from a body 111, and is formed by extruding and molding. A concave junction 113 is formed at each side edge of the plastic strip 100A along the longitudinal axis. When side edges of adjacent portions of the plastic strip 100A are joined to each other by winding, the concave junction 113 of a first portion of a plastic strip 100A and an opposite concave junction 113 of a second portion of the plastic strip 100A are arranged adjacent to one another to create a convex form. The connector 120 has a pair of joint ribs 121. The pair of joint ribs 121 is formed along the longitudinal axis of the plastic strip 100A. The joint ribs 121 have a form corresponding to the convex form of the adjacent junctions 113 of adjacent portions of the plastic strip 110. The plastic strip 100A adjoins mutually in a lining pipe process, and the connector 120 is inserted at the junctions 113, thereby interlocking the first portion of the plastic strip 100A and the second portion of the plastic strip 100A to form the lining pipe 10.

Next, the winding apparatus 1 concerning an enforcement form is explained.

Referring to FIGS. 1 and 2, the winding apparatus 1 comprises a forming frame 2 which goes around the inside of the underground damaged pipe 7, a joint mechanism 3 which interlocks a plastic strip 100, and a rail 4 which is arranged inside the forming frame 2 and regulates the course along the circumference of the forming frame 2.

Referring to FIGS. 1, 2, 4, and 5, the forming frame 2 has a fixed width and is formed annularly.

Figure 4:
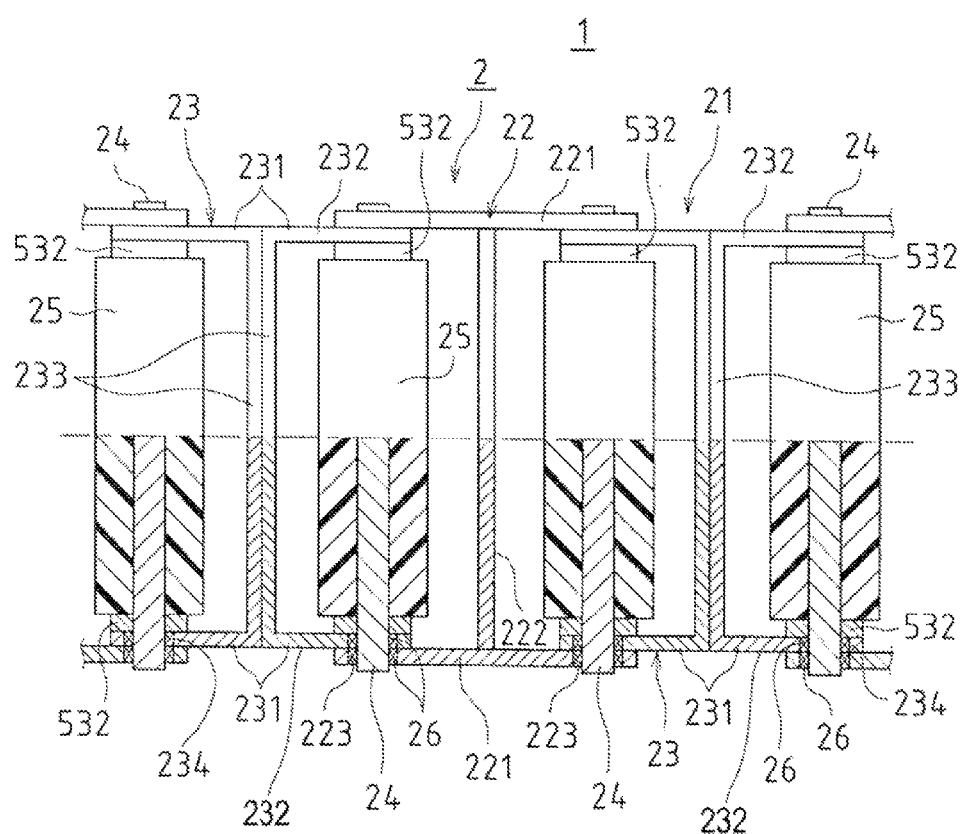
FIG. 4 is a fragmentary sectional view showing the details of the forming frame of the winding apparatus of the present invention.
Figure 5:
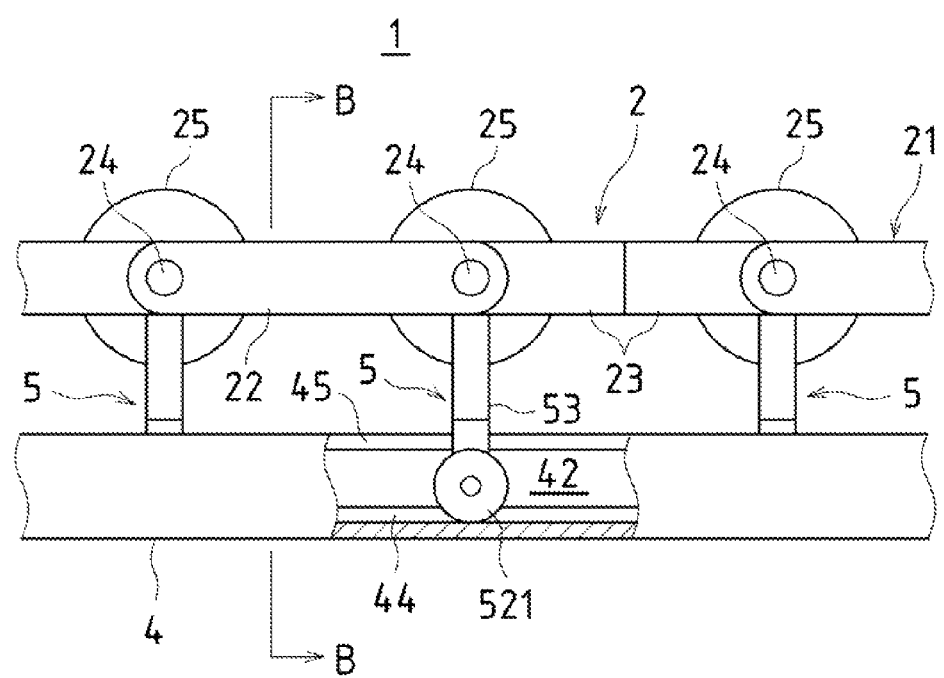
FIG. 5 is the forming frame, the rail, and the diagram showing a guide in the winding apparatus of the present invention.

The forming frame 2 has a plurality of links 21 connected to allow the forming frame 2 to rotate. As shown in FIGS. 4 and 5, each link 21 is equipped with an outside link 22 and an inner side link 23, and is arranged by turns.

The outside link 22 is equipped with two arm side covers 221 which are parallel to one another. For example, two arm side covers 221 may be located at an each end side of an inner roller 25. The outside link 22 is also equipped with a connection board 222 which maintains rigidity and extends from the center of one arm side cover 221 to the other arms side cover 221 such that the connection board 222 and the arm side covers 221 together form an "H" shape. A circular shaft hole 223 is established in each end of each arm side cover 221.

Two division pieces 231 are combined to form the inner side link 23. Each division piece 231 consists of two short links 232 and a backboard 233 arranged between the short links 232. In other words, two division pieces 231 are combined with a backboard 233 to form an "H" shape.

Each short link 232 has circular shaft holes 234 in positions corresponding to the shaft holes 223 of adjacent outside links 22.

The short link 232 of the inner side link 23 is arranged inside the arm side cover 221 of the outside link 22 to overlap with the arm side cover 221 such that the axial centers of the shaft holes 223 and 234 align. A shaft 24 is inserted through bearings 26 held in the shaft holes 223 and 234. The link 21 is equipped with a stop to the arm side cover 221, and prevents accordion like folding. For example, the inner side link 23 may be equipped with a stop to the arm side cover 221, and prevents accordion like folding. In other words, even if the forming frame 2 bends in the outside-diameter direction, it does not bend in the bore direction due to the link 21.

Each shaft 24 of the forming frame 2 is equipped with the inner roller 25.

Thus, the shaft 24 is supported so that the plurality of inner rollers 25 can rotate on the forming frame 2 about the shaft 24 of a link 21. For example, the shaft 24 is supported so that the plurality of inner rollers 25 can rotate on the forming frame 2 about the shaft 24 of the inner side link 23. Each inner roller 25 may be made of a hard synthetic resin or metal. The plurality of inner rollers 25 arranged at the forming frame 2 touches the inside of the wound plastic strip 100.

The forming frame 2 can be disassembled by removing the connection of a link 21. The assembly within the underground damaged pipe 7 can be performed by connecting a link 21.

Referring to FIGS. 1, 2, 3, 6, and 11, a joint mechanism 3 is attached to the forming frame 2. The joint mechanism 3 consists of a pair of rollers including an inner roller 31 and an outer roller 32. The joint mechanism 3 is arranged at a junction of the joined and helically wound plastic strips 100.

Referring to FIG. 6, the joint mechanism 3 consists of a gear box 33, gear mechanics 34 synchronized with the inner roller 31 and the outer roller 32, a sending roller 35 that rotates in connection with the gear mechanics 34, and a hydraulic motor 36 that drives the inner roller 31 and the outer roller 32.

The inner roller 31 may be cylindrical and may touch the inside of the plastic strip 100.

The inner roller 31 supports the plastic strip 100, which is pressed on the outside by the outer roller 32. The inner roller 31 is installed parallel to the inner roller 25. The inner roller 31 is supported by one end of shaft 342 or by both ends of shaft 342.

The outer roller 32 has two or more annular flanges 321, 322 arranged along a shaft 343. The annular flange 321 fits into a slot between the ribs 102 of the plastic strip 100. The outside of the annular flange 321 is knurled so as not to slide. Some annular flanges 322 are formed to be smaller in diameter than annular flanges 321. An annular flange 322 is inserted in the outside of the socket 105 of a plastic strip 100 such that it presses the inclination rib 106 of the plastic strip 100 to hook the inclination rib 106 to the rib 102 of a following portion of the plastic strip 100.

Referring to FIGS. 1, 2, and 6, the gear box 33 is fixed to the forming frame 2. The gear box 33 holds the shafts 341, 342, and 343 of the gear mechanics 34. The hydraulic motor 36 is attached to the front part of the gear box 33.

Referring to FIG. 6, the gear box 33 supports a shaft 342 to rotate shaft 342.

Shafts 341, 342, and 343 comprise gears 344, 345, and 346, respectively. The inner roller 31 is connected with the second shaft 342, and the outer roller 32 is connected with the third shaft 343. The second shaft 342 rotates in a direction opposite to the direction of rotation of the first shaft 341. The third shaft 343 rotates in the same direction as the first shaft 341.

The inner roller 31 and the outer roller 32 rotate oppositely and simultaneously to feed the plastic strip 100 which passes between the inner roller 31 and the outer roller 32. The rotation of shafts 341, 342, and 343 and the rotation of the inner roller 31 and the outer roller 32 can be adjusted by adjusting the number of teeth of the gears 344, 345, and 346.

Referring to FIGS. 2 and 6, the sending roller 35 is supported by the shaft 343 which also supports the outer roller 32 so that the sending roller 35 of a larger outside diameter than outside diameter of the outer roller 32 can rotate. The chain wheel is wound by the revolving shaft of the sending roller 35 and the inner roller 31. The sending roller 35 rotates by rotation of the hydraulic motor 36, and the perimeter side of sending roller 35 contacts the inside of the underground damaged pipe 7 and rotates it in the same direction as the inner roller 31. The sending roller 35 moves along the inside circumference of the underground damaged pipe 7.

When the joint mechanism 3 drives, the inner roller 31 and the outer roller 32 receive the plastic strip 100, rotate, and move along the circumference of the underground damaged pipe 7 to form the lining pipe 10. The sending roller 35 also rotates in contact with the inside of the underground damaged pipe 7.

Figure 3:
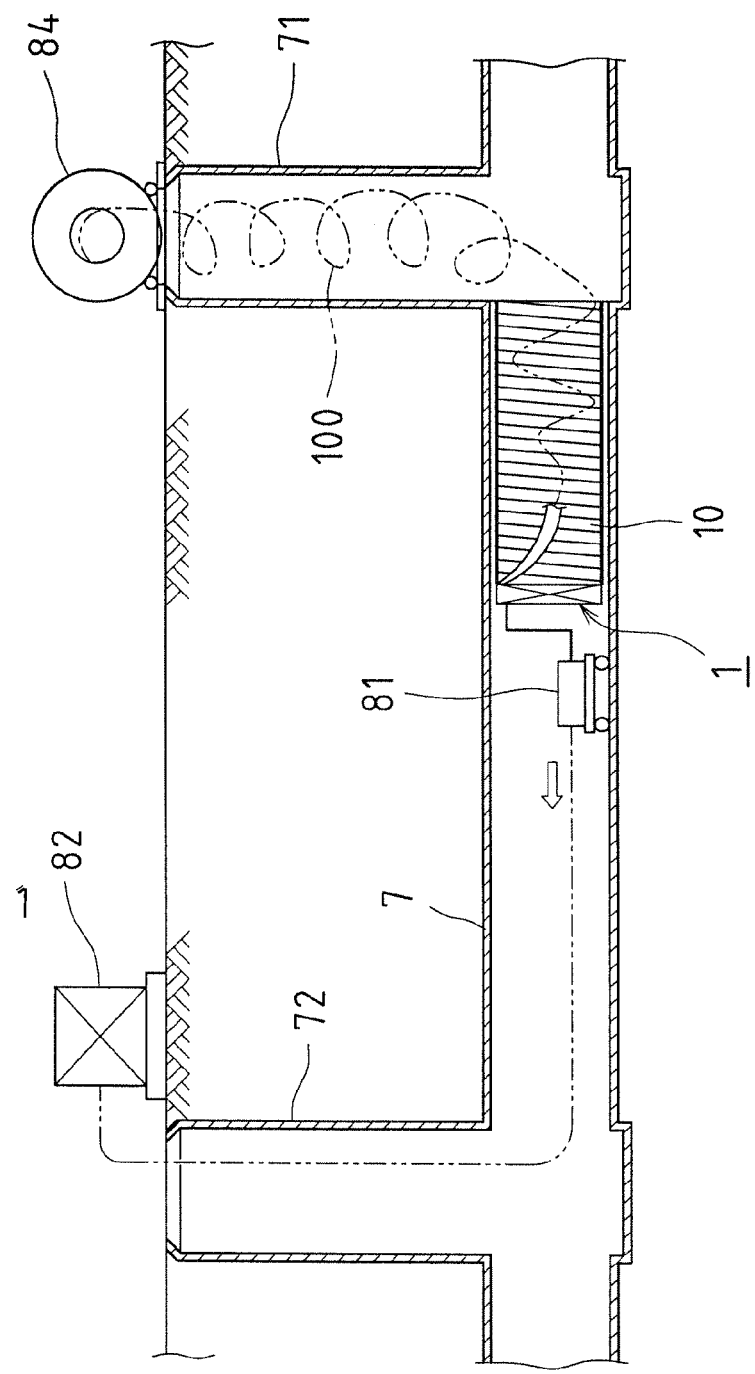
FIG. 3 is a diagram showing the lining pipe construction by the winding apparatus using the first embodiment of the present invention.

Referring to FIGS. 3 and 6, the hydraulic motor 36 connects a drive shaft with the first shaft 341, and is attached to the front of the gear box 33. The hydraulic motor 36 is driven with the pressure oil supplied through a pressure-oil hose from the oil-pressure unit 82.

The oil-pressure unit 82 supplies hydraulic power to hydraulic control unit 81 to power the winding apparatus 1. A pressure-oil hose extended from the hydraulic control unit 81 is connected to the hydraulic motor 36 through the rotary joint 83. Thereby, pressured oil can be supplied, without influencing the circumference of the winding apparatus 1 at movement.

Referring to FIGS. 1, 2, 5, 5(*a*), and 7-9, the rail 4 may be formed from a material which has high rigidity, such as steel. The rail 4 may be formed to have the same form as the cross-sectional form of the underground damaged pipe 7. The cross-sectional form of the underground damaged pipe 7 may be a rectangle or horseshoe shape.

Referring to FIG. 1, the rail 4 has an external rectangle form corresponding to a rectangle cross-section of the underground damaged pipe 7. The rail 4 can preferably be disassembled into small sections along its circumference, and can be assembled in the shape of an approximate rectangle within the underground damaged pipe 7. The rail 4 is formed inside the forming frame 2. The rail 4 may be formed to have a thin width as compared with the width dimension of the forming frame 2.

Figure 7:
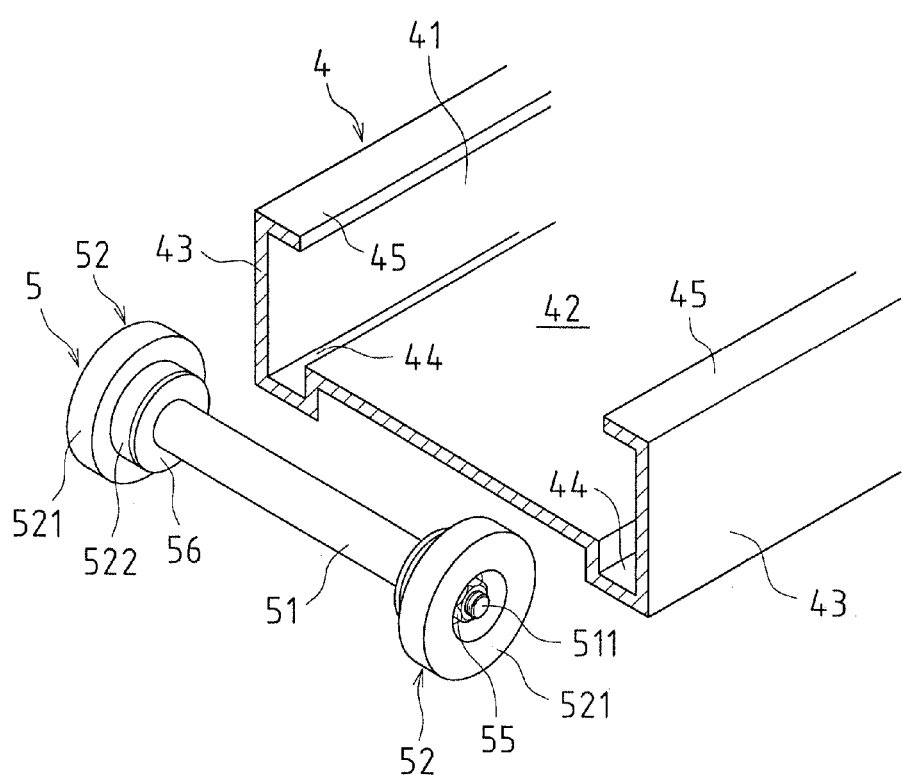
FIG. 7 is a perspective diagram showing one example of the structure of the rail and guide in the winding apparatus of the present invention.

Referring to FIG. 7, the rail 4 has an opening 41 along a longitudinal axis.

Figure 8:
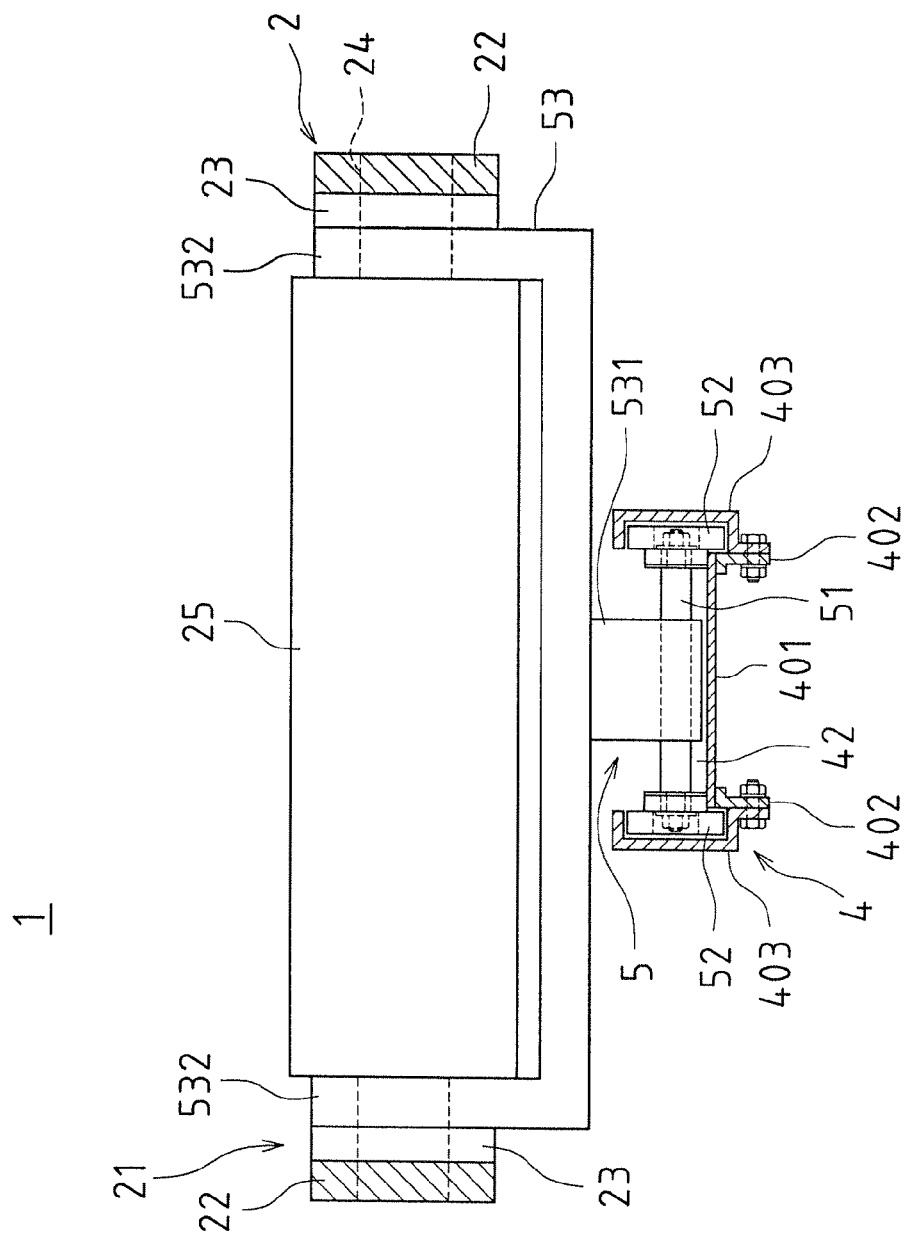
FIG. 8 is B-B sectional drawing of FIG. 5.

Referring to FIG. 8, this opening 41 is formed toward the outside of the forming frame 2. The inner side of the rails 4 defines the course 42 along which a connector 5 moves. The connector 5 is arranged in the course 42 which moves through the opening 41 of the rail 4. The course 42 permits movement of the connector 5 and holds the connector 5. The connector 5 guides the forming frame 2 along the perimeter of the rail 4. Referring to FIG. 1, a plurality of connectors 5 is fixed to the forming frame 2. Each connector 5 is arranged between the rail 4 and the forming frame 2. FIG. 5(*a*) shows an alternative to the connector configuration of FIGS. 1 and 5.

Referring to FIG. 8, each connector 5 consists of a roller shaft 51, guide rollers 52 which are connected at respective ends of the roller shaft 51, and roller supporting members 53 which are connected to the roller shaft 51 and support the forming frame 2. Referring to FIG. 7, the roller shaft 51 is arranged in the width direction of the course 42 of the rail 4. The length of the roller shaft 51 corresponds to the width of the course 42 of the rail 4.

The guide rollers 52 consist of a large diameter part 521 and a small diameter part 522. A guide roller 52 is connected at each end of the roller shaft 51 so that the diameter part 521 is disposed at the outside and the small diameter 522 is disposed at the inner side. Referring to FIG. 8, the roller supporting members 53 are connected so that the roller shaft 51 can be rotated, and the roller supporting members 53 are attached to the forming frame 2.

The roller supporting members 53 are disposed parallel to the longitudinal axis of the inner roller 25, and the roller supporting members 53 have a joint piece 531 with the roller shaft 51. The joint piece 531 comprises a bearing which receives the roller shaft 51.

Bearings 532 are formed in respective ends of the roller supporting members 53. The shaft 24 of the forming frame 2 includes the bearings 532. Each bearing 532 is arranged between the inner roller 25 and the link 21 at the shaft 24 of the forming frame 2. For example, each bearing 532 may be arranged between the inner roller 25 and the inner side link 23 at the shaft 24 of the forming frame 2.

By such structure, guide rollers 52 are held at the rail 4, and move a connector 5 along the circumference of the forming frame 2.

As shown in FIG. 7, the rail 4 is equipped with guide groove portions 44 at each edge thereof in the width direction of the course 42 on which the connector 5 moves. The guide groove portions 44 have a form corresponding to the external form of the guide roller 52. The large diameter part 521 of the guide roller 52 moves the connector 5 by rotating inside the guide groove portions 44. The rail 4 has lip parts 45 which follow the longitudinal axis and are arranged parallel and opposite to the guide groove portion 44. The lip parts 45 are formed in each side of the rail in the width direction along with the opening 41 of the rail 4. The lip part 45 has a width which can hold the large diameter part 521 of the guide roller 52. The circumference and the side of the large diameter part 521 of each guide roller 52 are covered by an outside cover part 43, the guide groove portion 44, and the lip part 45.

Figure 9:
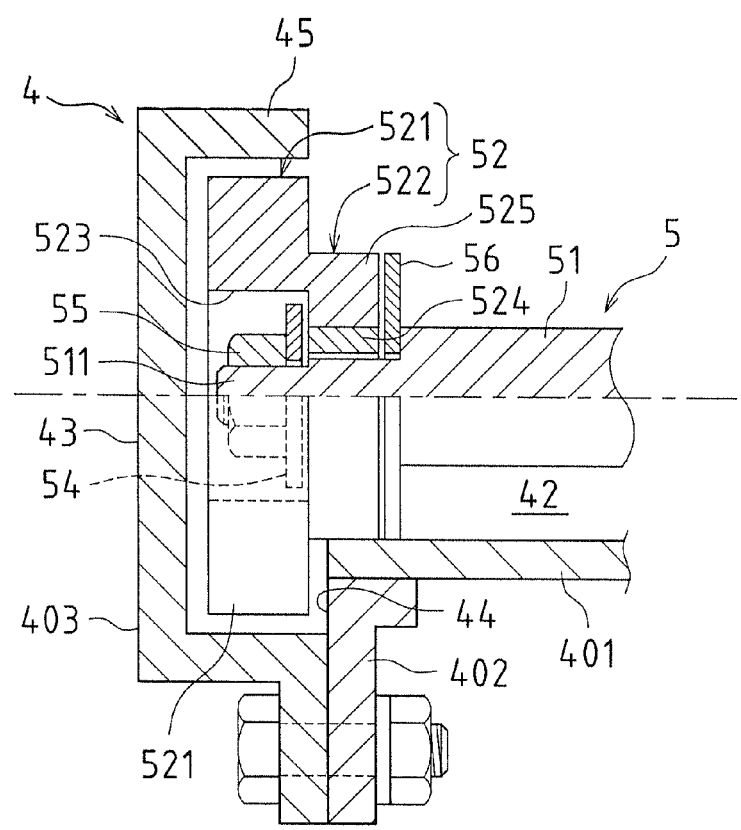
FIG. 9 is a diagram expanding and showing the rail shown in FIG. 8, and showing the partial section of a rail, and the half-section of a guide.

The cover component 403 of the rail 4 consists of the outside cover part 43, the guide groove portion 44, and the lip part 45. The rail 4 allows the large diameter part 521 to move and holds the large diameter part 521. The course 42 along which the connector 5 moves can interlock with a plate material 401 and form an angle material 402 having an "L"-shaped cross-section, and the cover components 403 define the sides of the course 42 as shown in FIG. 9. The external corner part of the guide groove portion 44 can be reinforced by interlocking the L shaped-like angle material 402 to the plate material 401.

Thereby, the difference in level of the large diameter part 521 of the guide roller 52 and the small diameter part 522 can fully receive a load in the external corner part of the guide groove portion 44 during movement of the connector 5.

In the embodiment illustrated in FIGS. 7-9, each guide roller 52 has a penetration hole centering on a shaft formed in the large diameter part 521 and the small diameter part 522. Reference to FIG. 9, the small diameter part 522 accommodates an inner pipe part 524 in the inner circumference of an outer case part 525.

The inner pipe part 524 slides on the roller shaft 51. The inner pipe part 524 has a bearing surface of the roller shaft 51. The inner pipe part 524 is inserted inside the penetration hole of the outer case part 525. The large diameter part 521 of the guide roller 52 has an axial center and a shape corresponding to a concave portion 523 connected with the penetration hole. The bore of the concave portion 523 has a larger diameter than the inner pipe part 524.

In this concave portion 523, a coupling part of the roller shaft 51 is accommodated. As shown in FIG. 9, there are bolt parts 511 at each end of the roller shaft 51. Each guide roller 52 accommodates the bolt part 511 of the roller shaft 51 in the concave portion 523 of the large diameter part 521, along with a washer 54, and a nut 55. The washer 54 and the nut 55 are stored in the concave portion 523 of the large diameter part 521, and do not project outside of the large diameter part 521. A flat washer 56 is also inserted into the roller shaft 51 at the side of the small diameter part 522. Each end of the roller shaft 51 may be equipped with a female screw part. In this case, each guide roller 52 is screwed in and fitted by the female screw part of the roller shaft 51 with a bolt through the concave portion 523 of the large diameter part 521. The head of the bolt is enclosed by the concave portion 523 of the large diameter part 521. As for each guide roller 52, it is desirable that the inner pipe part 524 of the small diameter part 522 is oil impregnated metal powder sintered bearing (oilless bearing) made by applying lubricating oil or lubricous grease to sintering metal.

Oil impregnated metal powder sintered bearing has self-lubricity. Metallic powder, such as copper powder, is molded and sintered, and lubricant, such as lubricating oil, is applied to the porosity of a sintering thing to form an oil impregnated metal powder sintered bearing.

The bearing design of the roller shaft 51 is simplified when the inner pipe part 524 of the small diameter part 522 comprises oil impregnated metal powder sintered bearing. In this case, supplying lubricating oil is unnecessary and prolonged use can be performed without an oil supply feed. Since the inner pipe part 524 is a strong cylindrical body even if subjected to a heavy load and impulse force, it is hard to damage. Therefore, a guide roller 52 can slide stably for a long time.

The winding apparatus 1 has a yield strength to the load which acts on the rail 4 and the connector 5, and can reduce the weight of the rail 4. The load which acts on the connector 5 is supported by the rail 4. The rail 4 and the connector 5 are made are made to be thin and small. The connector 5 can move smoothly and the forming frame 2 can be moved along the circumference of the underground damaged pipe 7, thereby allowing the lining pipe 10 to be formed with sufficient accuracy.

Because the weight of the rail 4 is reduced, assembly work, as well as carrying in and taking-out work into the underground damaged pipe 7, is simplified. Therefore, the productivity of the winding apparatus 1 and the lining pipe workability of the lining pipe 10 can be increased. Further, even if a heavy load acts on the forming frame 2, the rail 4, or the connector 5, it is hard to damage the guide roller 52 and the inner pipe part 524 of the connector 5. Therefore the life of the winding apparatus 1 can be extended and the need for exchange and repair can be reduced.

Next, the construction procedure of renovating the underground damaged pipe 7 using the winding apparatus 1 is explained.

Manholes 71 and 72 are arranged in the underground damaged pipe 7. FIG. 3 shows the downstream manhole 72 and the upstream manhole 71. The damaged pipeline between manhole 71 and manhole 72 is the pipe renovation construction length. The renovation construction method of the underground damaged pipe 7 forms the lining pipe 10 in the underground damaged pipe 7 by utilizing manholes 71 and 72.

The lining pipe 10 is produced towards the downstream manhole 72 from the upstream manhole 71. As shown in FIG. 3, in the underground damaged pipe 7 requiring renovation, the winding apparatus 1 and the oil-pressure unit 82 are positioned adjacent to the upstream manhole 71. A drum 84 with a turntable on which the plastic strip 100 (or plastic strip 100A) was wound is positioned above ground adjacent to the upstream manhole 71. The oil-pressure unit 82 is installed above ground adjacent to the downstream manhole 72.

The winding apparatus 1 is installed through the upstream manhole 71 into the underground damaged pipe 7 having a rectangle cross section. The forming frame 2 and the rail 4 of the winding apparatus 1 can be disassembled and then can be reassembled. Therefore, the winding apparatus 1 can easily be placed into the upstream manhole 71, and then assembled inside of the upstream manhole 71.

The joint mechanism 3 can be post-installed in the forming frame 2, and is attached to the assembled forming frame 2. The forming frame 2 receives the restraint of the rail 4 through a connector 5, and the assembled winding apparatus 1 is arranged in the shape of a rectangle around the rail 4.

After preparatory work, a plastic strip 100 is drawn into the underground damaged pipe 7 from the drum 84. The plastic strip 100 is inserted between the inner roller 31 of the joint mechanism 3 of the winding apparatus 1, and the outer roller 32.

Subsequently the plastic strip 100 is sent out to the outside of the inner roller 25. When the plastic strip 100 is wound spirally and the edges of adjacent portions of the plastic strip 100 are joined, a joint rib 103 is inserted in a joint socket 105. The side edge of the body 101 of the present portion of the plastic strip 100 is positioned at the socket 105 of the body 101 of a previous portion of the plastic strip 100. The inclination rib 106 of a present portion of a plastic strip 100 interlocks to the rib 103 of a following portion of the plastic strip 100. This forms the lining pipe 10 for a lining pipe start.

Then, the joint mechanism 3 of the winding apparatus 1 is driven. The hydraulic motor 36 of the joint mechanism 3 rotates, and the inner roller 31 and the outer roller 32 are rotated. The inner roller 31 and the outer roller 32 put and send out a plastic strip 100. Thereby, the joint mechanism 3 moves to the circumference with the sending direction along with a plastic strip 100 at an opposite direction relatively to.

The winding apparatus 1 rotates within the underground damaged pipe 7. When the winding apparatus 1 moves along the circumference of the underground damaged pipe 7, the forming frame 2 is regulated to have the shape of a rectangle along the form of the rail 4 through the connector 5. Referring to FIGS. 1 and 9, the guide rollers 52 of the connector 5 move along the guide groove portions 44 of the course 42. Even if a force acts on the connector 5 in the rail 4, the stage part of the large diameter part 521 of the guide roller 52 and the small diameter part 522 maintain a perimeter of the course 42, and hit the external corner part of the guide groove portion 44. Since the nut 55 is arranged at the concave portion 523, the outside of the guide roller 52 does not interfere with the outside cover part 43 of a rail 4.

At the bottom in the underground damaged pipe 7, the inside of the lip parts 45 of the rail 4 hold the circumferential field of the large diameter parts 521 of the guide rollers 52. Each guide roller 52 moves around the circumference smoothly along with the guide groove portion 44, without derailing from the guide groove portion 44. While moving to the circumference of the forming frame 2, the guide rollers 52 of the connector 5 are held by the guide groove portions 44 and the lip parts 45 of the rail 4, and move along the course 42. Therefore, the connector 5 can move smoothly and does not drop out of the rail 4 or derail.

The rail 4 is sufficient to hold the large diameter part 521 of each guide roller 52. Therefore, it is not necessary that the rail 4 be thick or have attached guide parts. Therefore, the rail 4 can be made to be thin, small, and lightweight.

Figure 11:
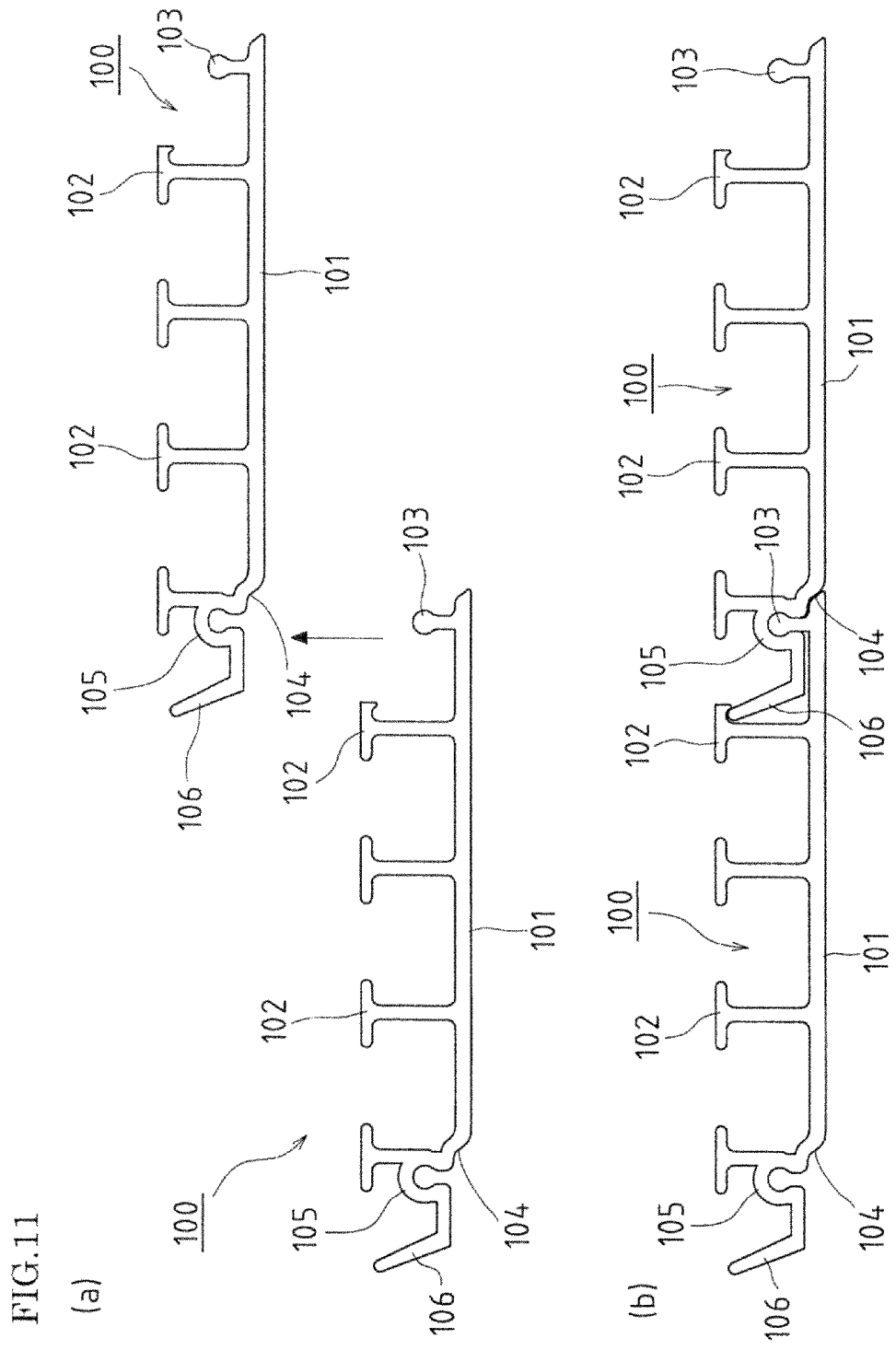
FIG. 11 (a) is an end elevation showing signs that the plastic strip of FIG. 10 is interlocked, and FIG. 11 (b) is an end elevation showing the interlocked plastic strip.
Figure 13:
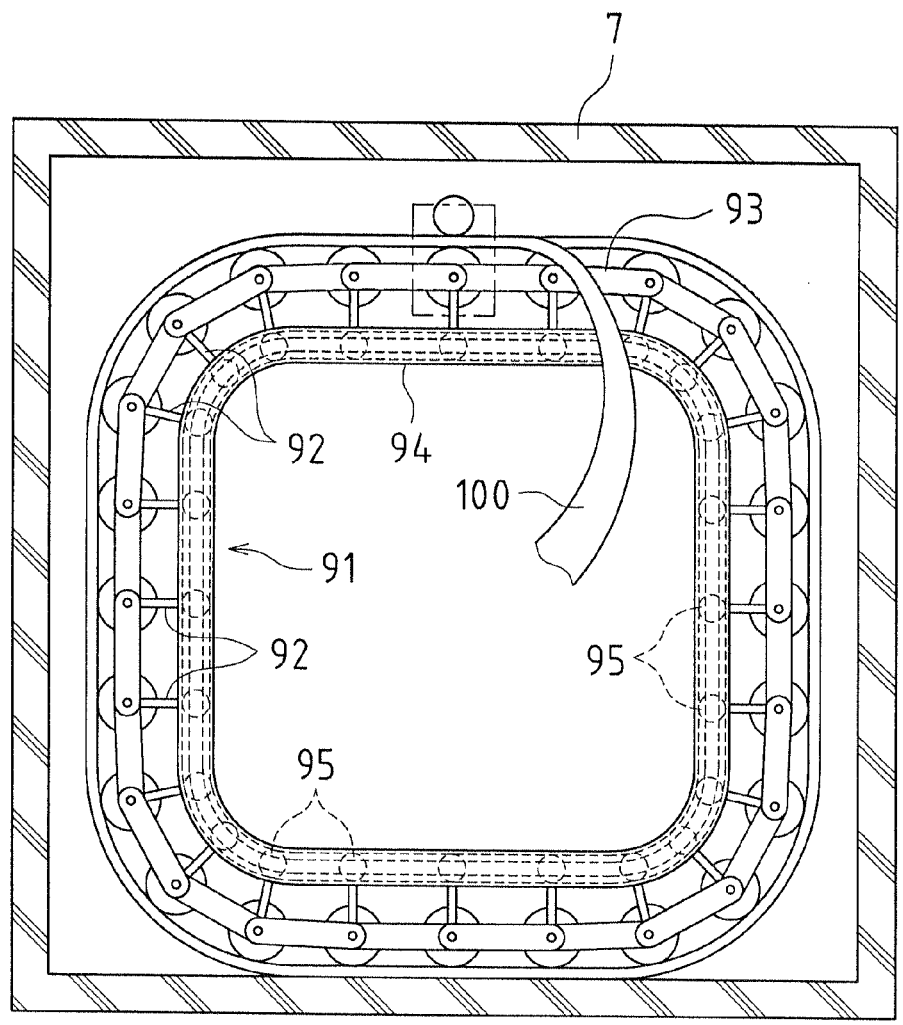
FIG. 13 is a front elevation showing the conventional winding apparatus.
Figure 14:
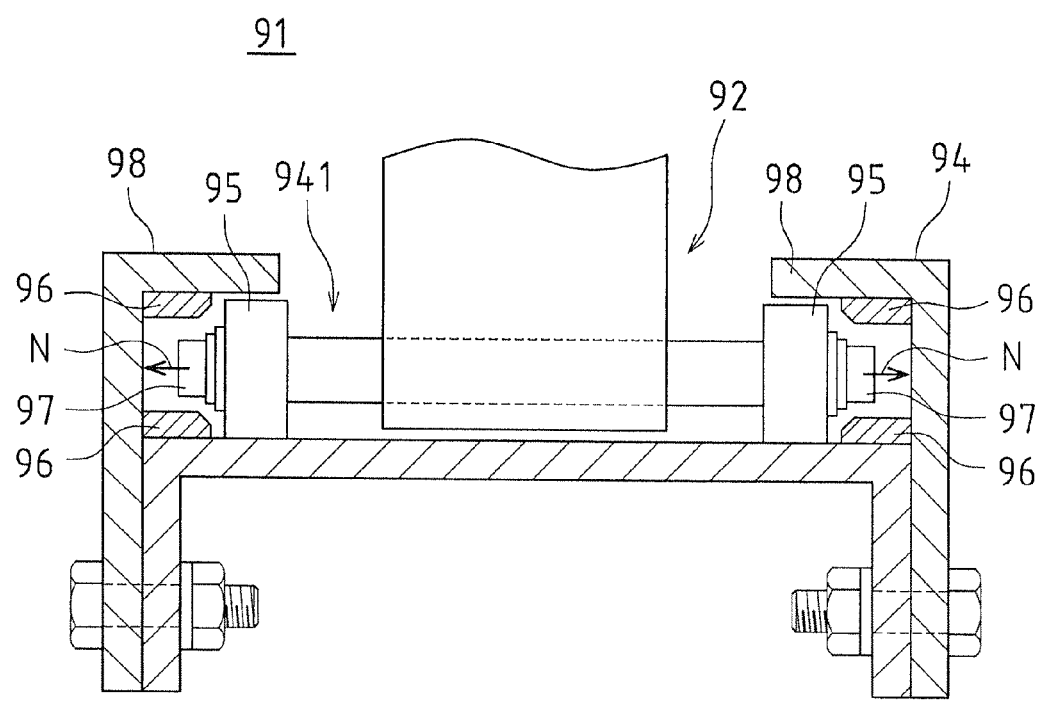
FIG. 14 is sectional drawing showing the conventional rail and guide of a winding apparatus.
Figure 15:
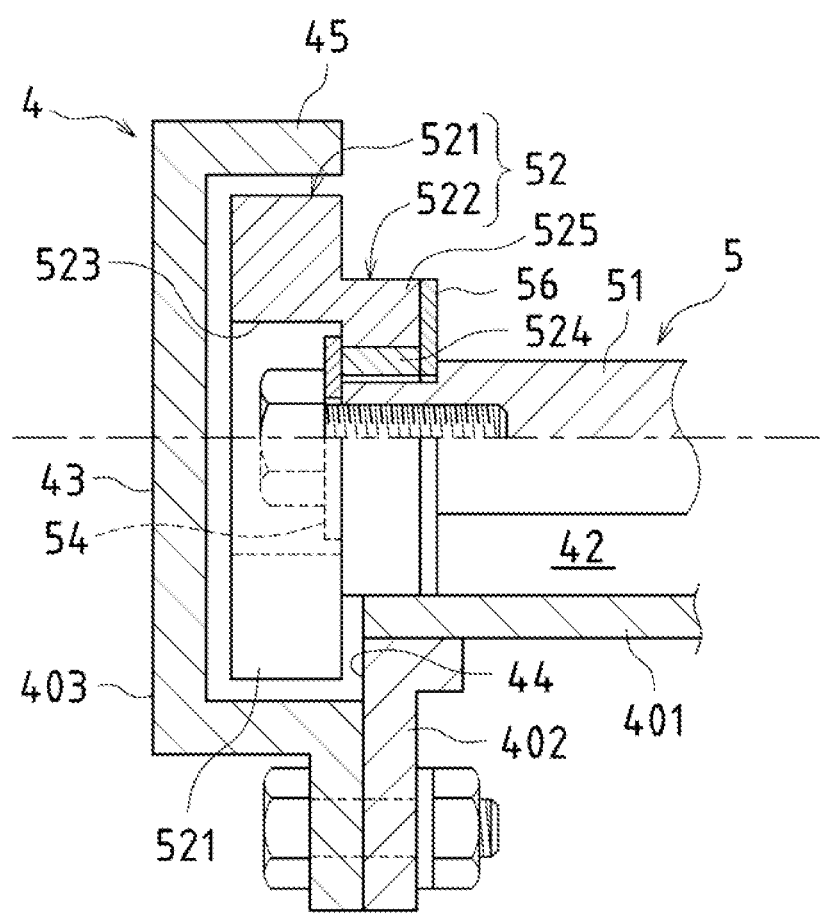
FIG. 15 is a diagram expanding and showing another example of the rail shown in FIG. 9, and showing the partial section of a rail, and the half-section of a guide, and showing the embodiment employing both the female screw part and the bolt (as well as the head).

Referring to FIG. 11, the joint mechanism 3 interlocks the joint rib 103 and the joint socket 105 of adjacent portions of the plastic strip 100. The joint rib 103 of the plastic strip 100 of the newly wound succession is interlocked to the joint socket 105 of the previous wound portion of the plastic strip 100. The side edge of the body 101 of the following portion of the plastic strip 100 overlaps the concave portion 104 of the previous portion of the plastic strip 100. The inclination rib 106 of the previous portion of the plastic strip 100 is caught in the rib 102 of the following portion of the plastic strip 100. Thus, the lining pipe 10 is formed.

When the lining pipe 10 arrives at the downstream manhole 72, the driving mechanism of the winding apparatus 1 is stopped. The winding apparatus 1 is disassembled and taken out from the downstream manhole 72. Backfill material, such as hardening mortar, is placed into the annular gap between the lining pipe 10 and the underground damaged pipe 7 and is allowed to harden, and then the underground damaged pipe 7 is renovated.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An apparatus for lining pipe for helically winding a plastic strip comprising:
a forming flame arranged inside of the pipe and having links and rollers;
a joint mechanism attached to the forming frame to adjoin side edges of adjacent portions of the plastic strip;
a rail arranged inside of the forming frame along a circumference of the forming frame;
wherein the forming frame has a plurality of links connected to one another, and a plurality of connectors, the plurality of links and the plurality of connectors moving along the rail,
each connector consists of a roller shaft supporting the forming frame, and a guide roller arranged on the roller shaft,
each guide roller comprises an outside large diameter part and an inside small diameter part, and
wherein the rail holds the guide rollers, has a course of the guide rollers, and has a guide groove for the large diameter parts of the guide rollers, and
wherein a width of the guide groove corresponds to a width of the large diameter part of the guide roller.

2. The apparatus according to claim 1, wherein
the rail has an outside cover covering both a circumferential surface of the large diameter part of each guide roller and an outer face of the large diameter part of each guide roller.

3. The apparatus according to claim 2, wherein
the guide groove has a right angle.

4. The apparatus according to claim 1, wherein
each guide roller has a bearing that is slidable on the corresponding roller shaft.

5. The apparatus according to claim 4, wherein
the small diameter part comprises a bearing of sintering oil impregnation lubricating oil, and the sintering oil impregnation lubricating oil is a lubricous grease applied by sintering metal.

6. The apparatus according to claim 1, wherein
each guide roller comprises a concave portion, the corresponding small diameter part is centered on the corresponding roller shaft, and a coupling part of the corresponding roller shaft is accommodated in the concave portion.

7. The apparatus according to claim 6, wherein
each end of each roller shaft has a bolt part accommodated in the concave portion of the large diameter part of the corresponding guide roller.

8. The apparatus according to claim 6, wherein
each roller shaft is formed with a female screw threaded part, a bolt to fit the female screw part penetrates through the concave portion of the large diameter part of the corresponding guide roller, and a head of the bolt is accommodated by the concave portion.

* * * * *